United States Patent [19]
Oda et al.

[11] Patent Number: 5,937,152
[45] Date of Patent: Aug. 10, 1999

[54] PRINTER WITH BUFFER MEMORY

[75] Inventors: Naoki Oda, Kasugai; Masaaki Hori, Tajimi, both of Japan

[73] Assignee: Brother Kogyo Kabushiki Kaisha, Nagoya, Japan

[21] Appl. No.: 08/842,671

[22] Filed: Apr. 15, 1997

[30] Foreign Application Priority Data

Apr. 16, 1996 [JP] Japan .................................. P8-119813
Apr. 24, 1996 [JP] Japan .................................. P8-129001

[51] Int. Cl.[6] .................................................. G06K 15/00
[52] U.S. Cl. .......................................... 395/115; 395/113
[58] Field of Search ..................................... 395/101, 113, 395/102, 109, 115, 116, 112; 358/404, 444; 382/305; 345/196, 152, 170, 171, 172, 173

[56] References Cited

U.S. PATENT DOCUMENTS 5,216,754   6/1993   Sathi et al. ............................... 395/115

*Primary Examiner*—Arthur G. Evans
*Attorney, Agent, or Firm*—Pollock, Vande Sande & Amernick

[57] ABSTRACT

A buffer memory 18 is formed with at least one buffer area, each for storing one band's worth of print data. The storage capacity of each buffer area is determined dependently on both the resolution and the print mode. The number of the buffer areas formed in the buffer memory is also determined dependently on both the resolution and the print mode. When the printer is supplied with successive bands' worth of print data at 720 dpi at a color print mode, the buffer memory is formed with a single buffer area for storing one band's worth of print data for four colors. The buffer area has four storage regions for the four colors. Each storage region is for storing one band's worth of print data for a corresponding color. When the printer is supplied with successive band's worth of print data at the same resolution in a monochromatic print mode, the buffer memory is formed with four buffer areas capable of storing four bands' worth of print data for a single color. Each buffer area is for storing one band's worth of print data for the single color.

27 Claims, 9 Drawing Sheets

FIG. 7

| RESOLUTION dpi | PRINT MODE | FIRST BUFFER ADDRESS | | SECOND BUFFER ADDRESS | | THIRD BUFFER ADDRESS | | FOURTH BUFFER ADDRESS | | EIGHTH BUFFER ADDRESS | SIXTEENTH BUFFER ADDRESS |
|---|---|---|---|---|---|---|---|---|---|---|---|
| 180 | MULTI-COLOR | Y<br>M<br>C<br>K | 00000H<br>04000H<br>08000H<br>0C000H | Y<br>M<br>C<br>K | 10000H<br>14000H<br>18000H<br>1C000H | | — | | — | | |
| 180 | MONO-CHROME | | 00000H | | 04000H | | 08000H | | 0C000H | 1C000H | 3C000H |
| 360 | MULTI-COLOR | Y<br>M<br>C<br>K | 00000H<br>08000H<br>10000H<br>18000H | Y<br>M<br>C<br>K | 20000H<br>28000H<br>30000H<br>38000H | | — | | — | | |
| 360 | MONO-CHROME | | 00000H | | 08000H | | 10000H | | 18000H | 38000H | |
| 720 | MULTI-COLOR | Y<br>M<br>C<br>K | 00000H<br>10000H<br>20000H<br>30000H | | — | | — | | — | | |
| 720 | MONO-CHROME | | 00000H | | 10000H | | 20000H | | 30000H | | |

AM

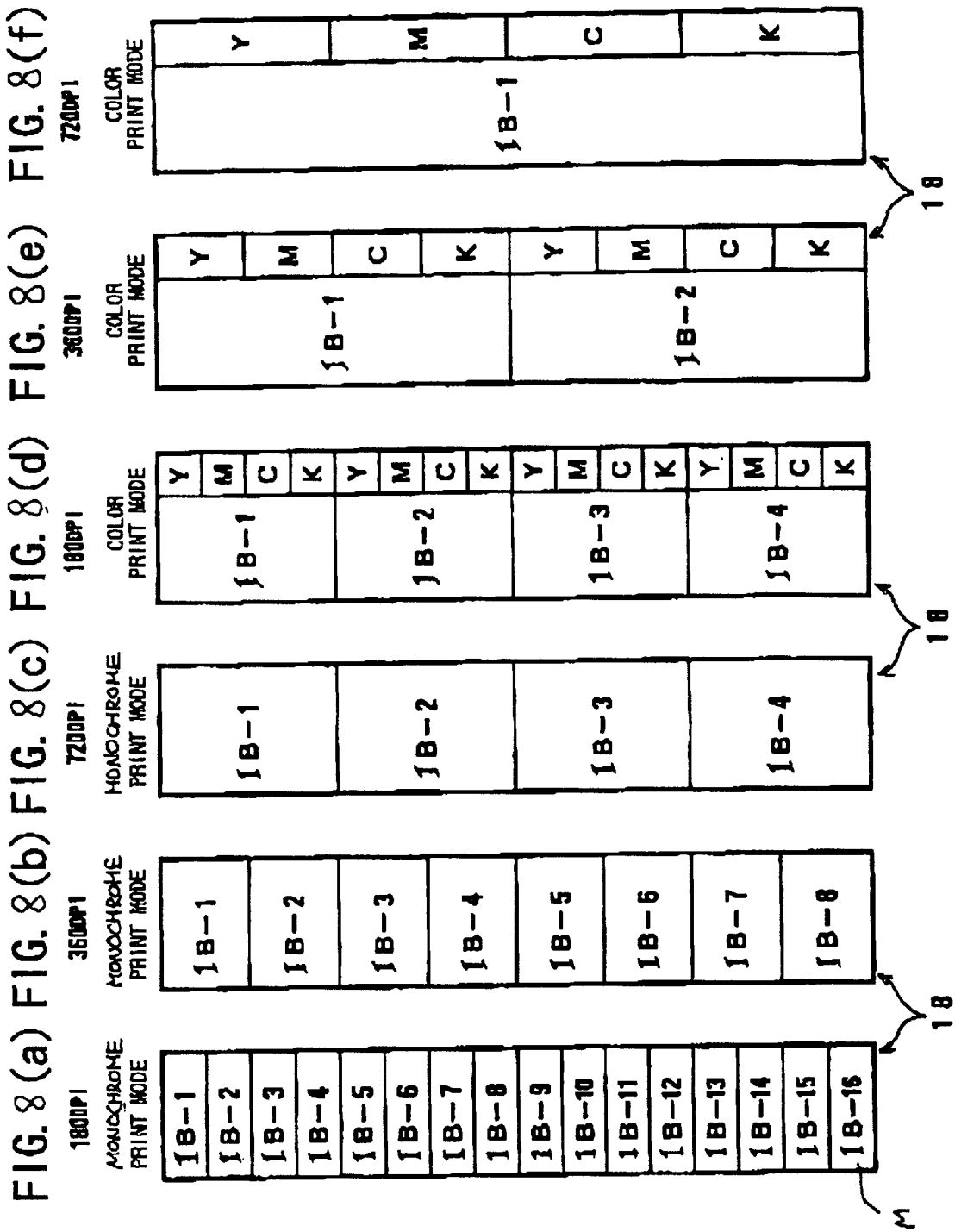

PRINTER WITH BUFFER MEMORY

BACKGROUND OF THE INVENTION

1. Field of the Invention

The present invention relates to a printing device capable of printing in a plurality of resolution types and both in a multicolor print mode and in a monochrome print mode.

2. Description of Related Art

In order to record data of characters and figures into a visual form, information processing devices, such as personal computers, are often connected to a printing device capable of recording the data on sheets. A variety of printing methods, such as an impact printing method, a thermal printing method, and an ink-jet printing method, are used in the printing device. Normally, a print head of the printing device is provided with a plurality of recording elements which function according to the particular printing method. The print head is scanned in a main scanning direction to print one band's worth of data on the sheet. Then, the sheet is scanned one band's width in an auxiliary scanning direction. This printing process is repeated so that an entire sheet can be printed out.

A conventional printing device is provided with a print head and a buffer memory. In the buffer memory, a storage region is formed for temporarily storing one band's worth of print data. When the printing device receives one band's worth of print data, the device writes the received data in the storage region of the buffer memory. Then, while the print head is scanned in the main scanning direction, the print data stored in this storage region is retrieved and the recording elements are driven in accordance with the print data. In this way, one band image is printed on the sheet. After the printing operation for this band is completed, the next band's worth of print data is written in the storage region of the buffer memory and printing operation for the next band is performed in the same way as described above.

SUMMARY OF THE INVENTION

There is a printing device of a type capable of receiving print data of various resolutions and printing the various resolution images. In this type of device, the data capacity of the storage region has to be previously set for storing one band's worth of data for the highest resolution. Accordingly, when printing is performed at a resolution less than the highest resolution, empty regions will always be generated in the storage region sot hat the buffer memory is not efficiently used.

There is a printing device provided with a plurality of print heads for printing a plurality of different colors. There is a printing device of a type which can perform both a multi-color print mode for printing color images with using the plurality of print heads and a monochromatic print mode for printing only black and white images with using a single print head for black. In this case, the buffer memory has to be formed with a plurality of storage regions each for storing one band's worth of print data of a corresponding color. The number of the thus formed storage regions is equal to the number of the print heads. Still in this case, during the monochromatic printing mode, several storage regions will be left unused so that the buffer memory is inefficiently used.

An object of the present invention is therefore to provide an improved printing device capable of always using a buffer memory with high efficiency.

In order to attain these and other objects, the present invention provides a printing device for receiving print data and for printing an image represented by the print data, the device comprising: print data receiving means for receiving print data indicative of an image and for receiving information on an amount of the print data; a buffer memory capable of temporarily storing the received print data; storage region setting means for setting at least one storage region in the buffer memory based on the received information on the amount of print data; write and read means for writing the print data in the storage region of the buffer memory and for reading the print data from the storage region of the buffer memory; and a print head for receiving the print data read out by the write and read means to print the image. The storage region setting means may set the at lest one storage region so that a capacity of each of the at least one storage region is determined dependent on the amount of print data. The storage region setting means may set the at least one storage region so that the number of the at least one storage region is determined dependent on the amount of print data. The information on the print data amount may include resolution of the image represented by the print data. The information on the print data amount may include the number of different colors included in the image represented by the print data.

The control means may control the write and read means to write the print data into one of the at least one storage region while reading the print data into another one of the at least one storage region. The control means may serially switch the at least one storage region to be written and read by the write and read means.

According to another aspect, the present invention provides a printing device capable of printing in a plurality of resolutions, the device comprising: data reception means for receiving successive sets of print data indicative of successive image portions; a buffer memory capable of being set with a storage region for storing the received print data; a controller for receiving an indication signal indicating a resolution of each image portion and for setting at least one storage region in the buffer memory, the number of the at least one storage region and storage capacity of each storage region being determined dependent on the resolution; write means for writing each set of print data in one of the at least one storage region; read means for reading each set of print data from the storage region and for printing a corresponding image portion based on the read set of print data; and switching means for, when the controller sets more than one storage region, serially switching the more than one storage region to be read, thereby allowing the read means to print the successive image portions. The read means may include a print head for printing each image portion based on the read set of print data. The printing device may further comprise a print moving mechanism for moving the print head in a main scanning direction across a recording medium while the print head print an image portion based on the set of print data, thereby printing one band image. The switching means may switch so that writing by the write means and reading by the read means are performed simultaneously onto different storage regions.

According to a further aspect, the present invention provides a printing device for receiving print data and for printing an image, the device comprising: data receiving means for receiving successive sets of print data and for receiving an indication signal indicative of either a multicolor print mode or a monochrome print mode; a plurality of print heads each for printing a corresponding one of a plurality of different colors; a buffer memory capable of storing, for each print head, at lest one set of print data; control means for setting at lest one storage region in correspondence with each of the plurality of print heads upon receiving the indication signal for the multi-color print mode and for setting more than one storage region in correspondence with one of the print heads upon receiving the indication signal for the monochrome print mode, each storage region having a storage capacity capable of storing one set of print data for a corresponding color; write means for writing the print data in the storage region; read means for reading the print data from the storage region; and switching means for serially switching the more than one storage region, which are set during the monochrome print mode, to be written and to be read. The switching means may switch so that writing by the write means and reading by the read means are performed simultaneously onto different storage regions.

BRIEF DESCRIPTION OF THE DRAWINGS

The above and other objects, features and advantages of the invention will become more apparent from reading the following description of the preferred embodiment taken in connection with the accompanying drawings in which:

FIG. 7 illustrates an address memory AM provided in an address generator in the ASIC portion of FIG. 6;

FIGS. 8(a)–8(f) show how a buffer memory is set with at least one buffer area according to an operator's selected resolution and print mode, in which FIG. 8(a) showing that the buffer memory is set with sixteen buffer areas for storing sixteen bands' worth if print data for a single color when the resolution is 180 dpi and the print mode is the monochromatic mode, FIG. 8(b) showing that the buffer memory is set with eight buffer areas for storing eight band' worth of print data for a single color when the resolution is 360 dpi and the print mode is the monochromatic mode, FIG. 8(c) showing that the buffer memory is set with four buffer areas for storing four band' worth of print data for a single color when the resolution is 720 dpi and the print mode is the monochromatic mode, FIG. 8(d) showing that the buffer memory is set with four buffer areas for storing four band' worth of print data for four colors when the resolution is 180 dpi and the print mode is a color monochromatic mode, FIG. 8(e) showing that the buffer memory is set with two buffer areas for storing two band' worth of print data for four colors when the resolution is 360 dpi and the print mode is the color mode, FIG. 8(f) showing that the buffer memory is set with a single buffer area for storing one band's worth of print data for four colors when the resolution is 720 dpi and the print mode is the color mode;

DETAILED DESCRIPTION OF THE PREFERRED EMBODIMENT

A printer according to a preferred embodiment of the present invention will be described while referring to the accompanying drawings.

According to the present embodiment, when the printer is supplied with a successive sets of print data, at least one storage region is set in the buffer memory in accordance with information on the amount of the print data. That is, a storage capacity of the storage region is determined based on the print data amount. The number of the storage region to be set in the buffer memory is also determined based on the print data amount.

It is now assumed that the printer is of a type in which a print head prints one band image while the print head is scanned once in a main scanning direction. In this case, the printer is supplied with successive band' worth of print data. A storage capacity of each storage region is determined dependent on the amount of each band's worth of print data. The number of the storage regions to be set in the buffer memory is also determined dependent on the amount of each band's worth of print data.

Figure 1:
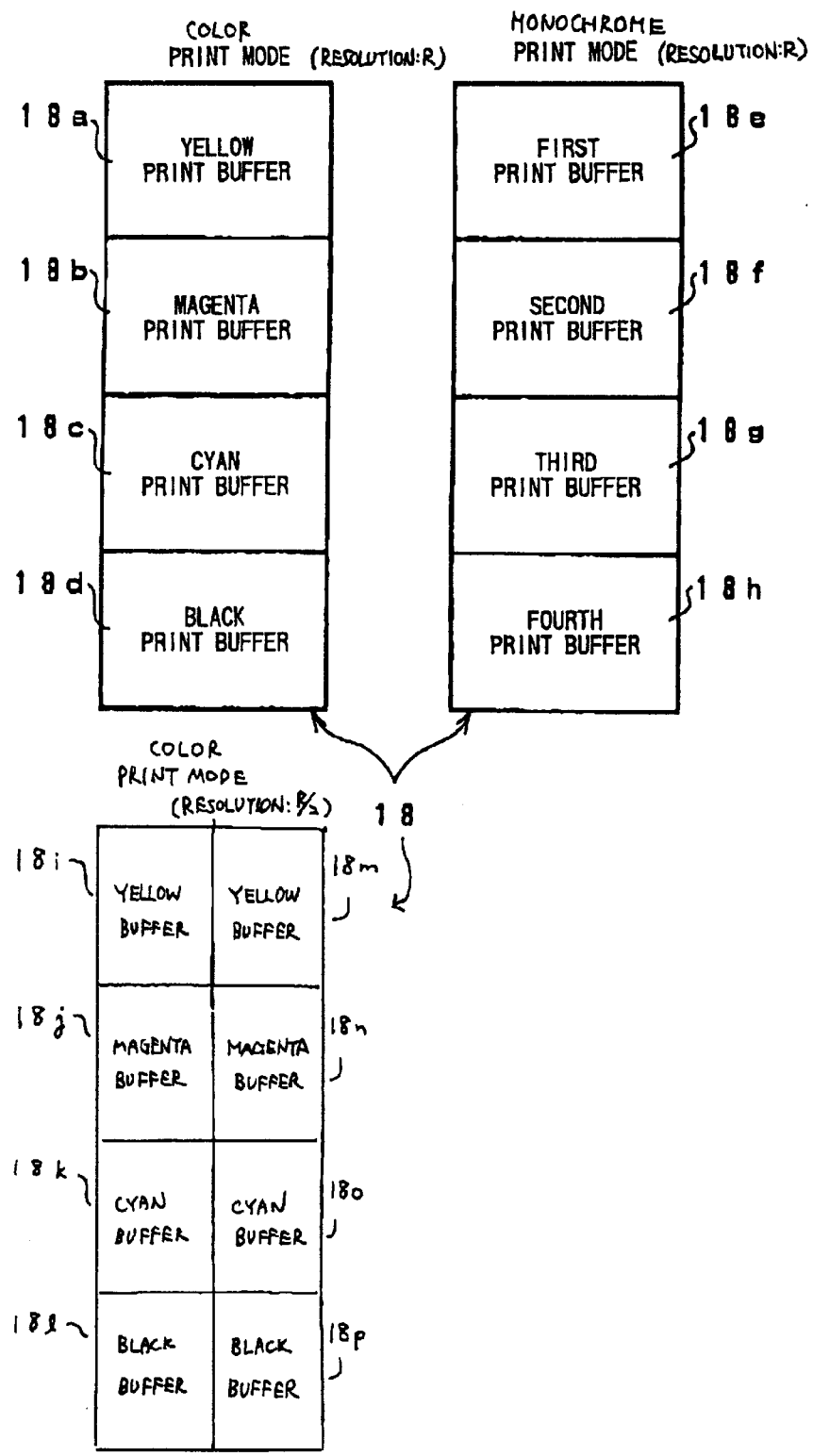
FIG. 1 illustrates how a buffer memory is set with at least one storage region for storing one band's worth of print data in correspondence with a resolution and a print mode according to an embodiment of the present invention.

It is now assumed that as shown in FIG. 1, the buffer memory (18 in this example) has a total storage capacity of storing one band's worth of print data for four colors (yellow, magenta, cyan, and black) at a certain amount of resolution R.

In this case, when the printer is supplied with successive bands' worth of print data for a color image at that resolution R, the buffer memory 14 is set with four storage regions 18a through 18d for the four colors. Each storage region has a storage capacity for storing one band's worth of data for a single color. Accordingly, when the printer is supplied with one band's worth of print data of the four colors, the print data is stored in the storage regions 18a–18d. After the print data is retrieved from the buffer memory 18 to be printed by the print head, a next band's worth of print data is stored in the buffer memory 18.

On the other hand, when the printer is supplied with successive bands' worth of print data for a monochromatic image at the same resolution R, the buffer memory 18 is set with four storage regions 18e through 18h for a single color. Each storage region has a storage capacity for storing one band's worth of data for the single color. Accordingly, each of the storage regions 18e–18h has the same capacity with that of each of the storage regions 18a–18d. Accordingly, the buffer memory can store four bands' worth of print data of the single color in the storage regions 18e–18h at maximum. While one band's worth of print data is retrieved from one storage region for printing, a next band's worth of print data can be written into another storage region. That is, while one band's worth of data is retrieved from the area 18e, the next band's worth of data is written in the area 18f. While the data is retrieved from the area 18f, the next band's worth of data is written in the area 18g. thus, the print head is continuously supplied with successive band' worth of print data without any interruption therebetween and continuously print the corresponding successive band images. A printing speed is enhanced.

Similarly, when the printer is supplied with successive bands' worth of print data for a color image at a lower resolution R/2, the buffer memory 14 is set with eight storage regions 18i through 18p. Each storage region has a storage capacity for storing one band's worth of data for a single color at that resolution R/2. The capacity of each of the regions 18i–18p is therefore a half of that of each of the regions 18a–18d. In this example, the four storage regions 18i through 18l are for storing one band's worth of print data for four colors. The remaining four storage regions 18m through 18p are for storing another band's worth of print data for the four colors. Accordingly, the buffer memory 18 can store, at a time, two bands' worth of print data for the four colors. While one band's worth of print data is retrieved from the storage regions 18i–18l for printing, a next band's worth of print data is written into the storage regions 18m–18p. Thus, the print head is continuously supplied with successive bands' worth of print data without any interruption and continuously prints the corresponding successive band images. A printing speed is also enhanced.

It should be noted that in the above description, all of the buffer areas 18a through 18d used during the color print mode are used as the buffer areas 18e through 18h during the monochromatic print mode. However, it is sufficient that at least two of the four buffer areas 18e through 18h be set to be used. This is because reading and writing operations for the print data can be simultaneously performed in different ones of the two buffer areas so that printing can be performed without interruption. Also, although the buffer memory 18 is provided with only a minimum capacity required for forming four storage regions for printing in full color at the resolution R, the buffer memory can be provided with more than this amount of capacity.

The embodiment of the present invention will be described below is greater detail while referring to FIGS. 2 through 11.

Figure 2:
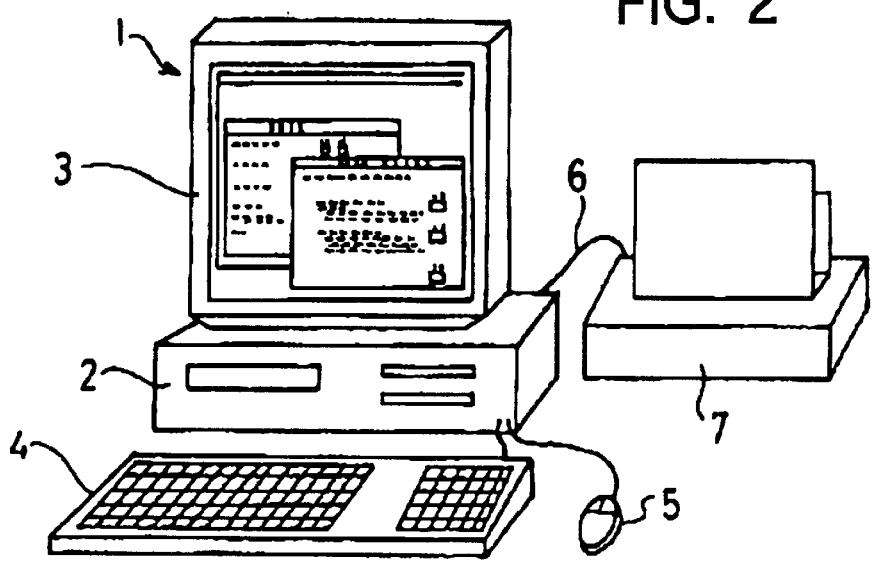
FIG. 2 is a perspective view of a printing of the embodiment which is connected to an information process device.

As shown in FIG. 2, a printing device 7 according to the present embodiment is connected to an information process device 1 such as a personal computer. The information process device 1 includes: a process device main body 2 which houses a central computation device and an auxiliary storage device such as an electromagnetic disk; a cathode-ray tube (CRT) 3 for displaying screens of data; a keyboard 4 used to input data and commands; and a mouse 5. The printer 7 is a serial type print device, for example, and is connected to the information process device 1 via a Centronics type printer cable 6 (i.e., an eight bit parallel transmission cable defined by IEEE 1284 standard), for example.

Figure 3:
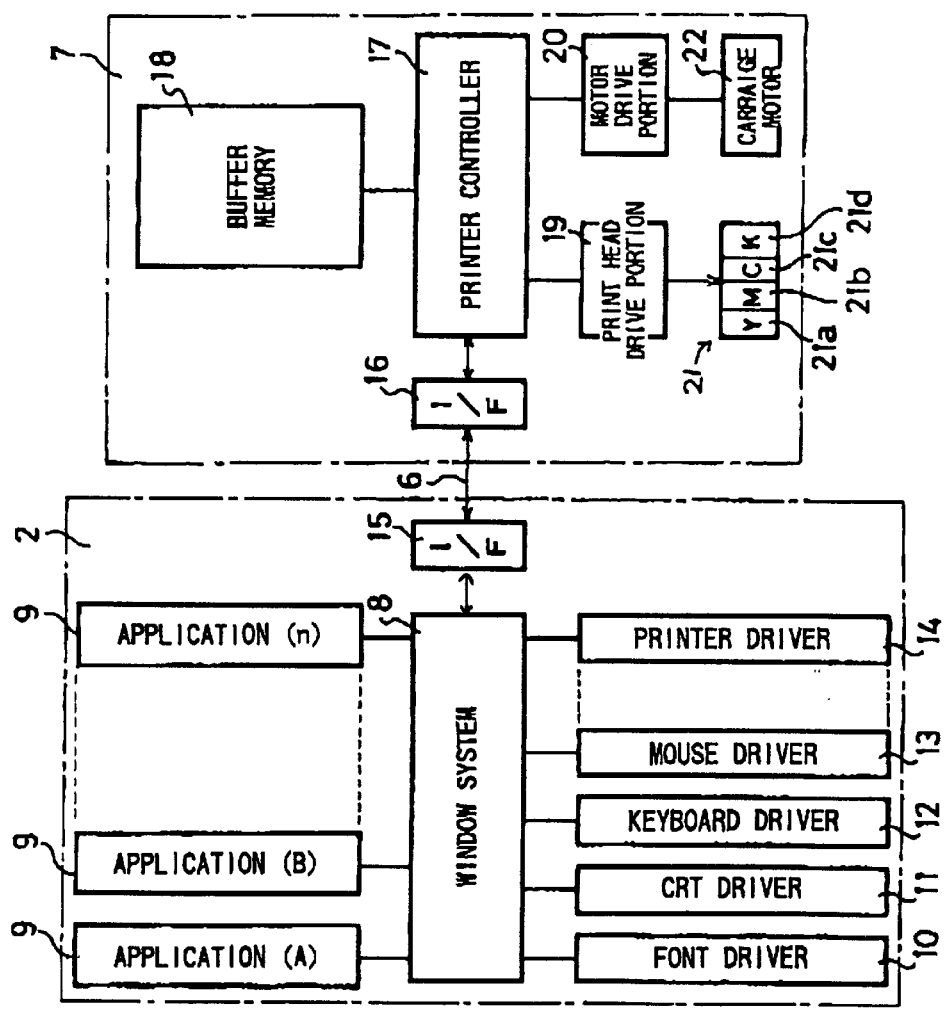
FIG. 3 is a block diagram showing structure of the printer of the present invention and the information process device.

As shown in FIG. 3, the process device main body 2 includes a window system 8 as its operating system (OS). The window system 8 is capable of simultaneously executing one or more of a plurality of application software programs 9 such as a word processor program. The window system 8 is connected to: a font driver 10 for managing various types of font; a CRT driver 11 for managing the CTR 3; a keyboard driver 12 for managing the kebyboard 4; a mouse driver 13 for managing the mouse 5; and a printer driver 14 for managing the printer 7. The window system 8 executes the application software programs in association with those drive elements. The window system 8 is further connected to an interface (I/F) portion 15.

The printer driver 14 is for producing dot image data based on pixel data indicative of a photograph and a graph and font data of a text desired to be printed.

The print driver 14 is capable of producing dot image data indicative of both color (multicolor) and monochromatic images. That is, an operator can select one of a monochromatic print mode and a multicolor print mode on a print menu displayed on the screen of the CRT 3. When the multicolor print mode is selected, the printer driver 14 produces dot image data for four colors, that is, yellow color (Y), magenta color (M), cyan color (C), and black color (K). On the other hand, when the monochromatic print mode is selected, the printer driver 14 produces dot image data for only one of the four colors. That is, in order to print a black and white image, the printer drive 14 produces dot image data for black color only. In order to print another type of monochromatic image, the printer driver 14 produces dot image data for yellow, magenta, or cyan color only.

The print driver 14 is capable of producing dot image data for each of the multicolor and monochromatic images at several resolutions. In this example, the operator can select his/her desired resolution from resolutions of 720 dpi, 360 dpi, and 180 dpi which are listed on the print menu on the CRT screen. The printer driver 14 produces dot image data at the operator's selected resolutions.

The printer driver 14 produces, for each color, dot image data so that the dot image data includes a plurality of pieces of pixel data juxtaposed in a dot matrix form. It is noted that the dot matrix is constructed from a plurality of bands' worth of print data which are arranged in an auxiliary scanning direction. As will be described later, each band's worth of print data is indicative of one band image to be printed by a single scanning action by a print head structure 21 of the printer 7 in a main scanning direction, which is almost perpendicular to the auxiliary scanning direction. Each band image is formed from 64 lines of ink dots which are produced by 64 nozzles provided to the print head structure 21. Each band's worth of print data for each color is therefore constructed from 64 rasters, each raster extending in the main scanning direction. Each raster is constructed from a plurality of dots. For example, each raster is constructed from 1,440 dots when the print data is produced at the resolution of 180 dpi. Each raster's worth of print data is therefore constructed from 180 bytes of print data. Each raster is constructed from 2,880 dots when the print data is produced at the resolution of 360 dpi. Accordingly, each raster's worth of print data is constructed from 360 bytes of print data. Each raster is constructed from 5,760 dots when the print data is produced at the resolution of 720 dpi. Accordingly, each raster's worth of print data is constructed from 720 bytes of print data.

The printer driver 14 then serially outputs the thus produced dot image data via the interface (I/F) portion 15 in eight bit (one byte) units as a successive series of print data. In the case where the print data is produced at the resolution of 180 dpi, for example, when the printer driver 14 completely outputs 180 bytes of print data for each of all the colors, the printer driver 14 completely outputs one raster for all the colors. Thus, the print data is outputted in a raster scan format to the printer 7.

It is now assumed that the amount of each band's worth of print data is M when the print data is produced so as to indicate a monochromatic image at 180 dpi. When the print data is produced to indicate a monochromatic image at 360 dpi, the amount of each band's worth of print data becomes 2M. When the print data is produced to indicate a monochromatic image at 720 dpi, the amount of each band's worth of print data becomes 4M. When the print data is produced to indicate a color image at 180 dpi, on the other hand, each band's worth of data is constructed from data of the four colors for a corresponding band. Accordingly, the amount of each band's worth of print data becomes 4M. When the print data is produced to indicate a color image at 360 dpi, the amount of each band's worth of print data becomes 8M. When the print data is produced to indicate a color image at 720 dpi, the amount of each band's worth of print data becomes 16M.

According to the present embodiment, successive bands' worth of print data are transmitted from the interface portion 15 to an interface portion 16 of the printer 7. In order to transmit each band's worth of print data, the printer driver 14 successively transmits 64 rasters' worth of print data constructing each band. It is noted that, during the multicolor print mode, the printer driver 14 successively outputs print data of four colors for each raster. It is further noted that the printer driver 14 transmits a transmission command before transmitting each raster's worth of print data of a single color. Accordingly, during the multicolor print mode, the printer driver 14 transmits a transmission command before transmitting each raster data of each color. The transmission command is also sent to the interface portion 16 via the interface portion 15.

It is further noted that in response to the operator's selection of the resolution, the printer driver 14 produces a resolution indication command indicative of the selected resolution. Similarly, in response to the operator's selection of the print mode (multicolor mode or monochromatic mode), the printer driver 14 produces a mode indication command indicative of the selected mode. The printer driver 14 transmits the resolution indication command and the mode indication command to the printer 7 before sending the successive bands' worth of print data. The commands are sent to the printer 7 via the interfaces 15 and 16.

As shown in FIG. 3, the printer 7 has: a printer controller 17; a buffer memory 18 capable of setting therein printer buffer areas (storage areas) for, for example, yellow color (Y), magenta color (M), cyan color (C), and black color (K); a print head drive portion 19; and a motor drive portion 20.

Figure 4:
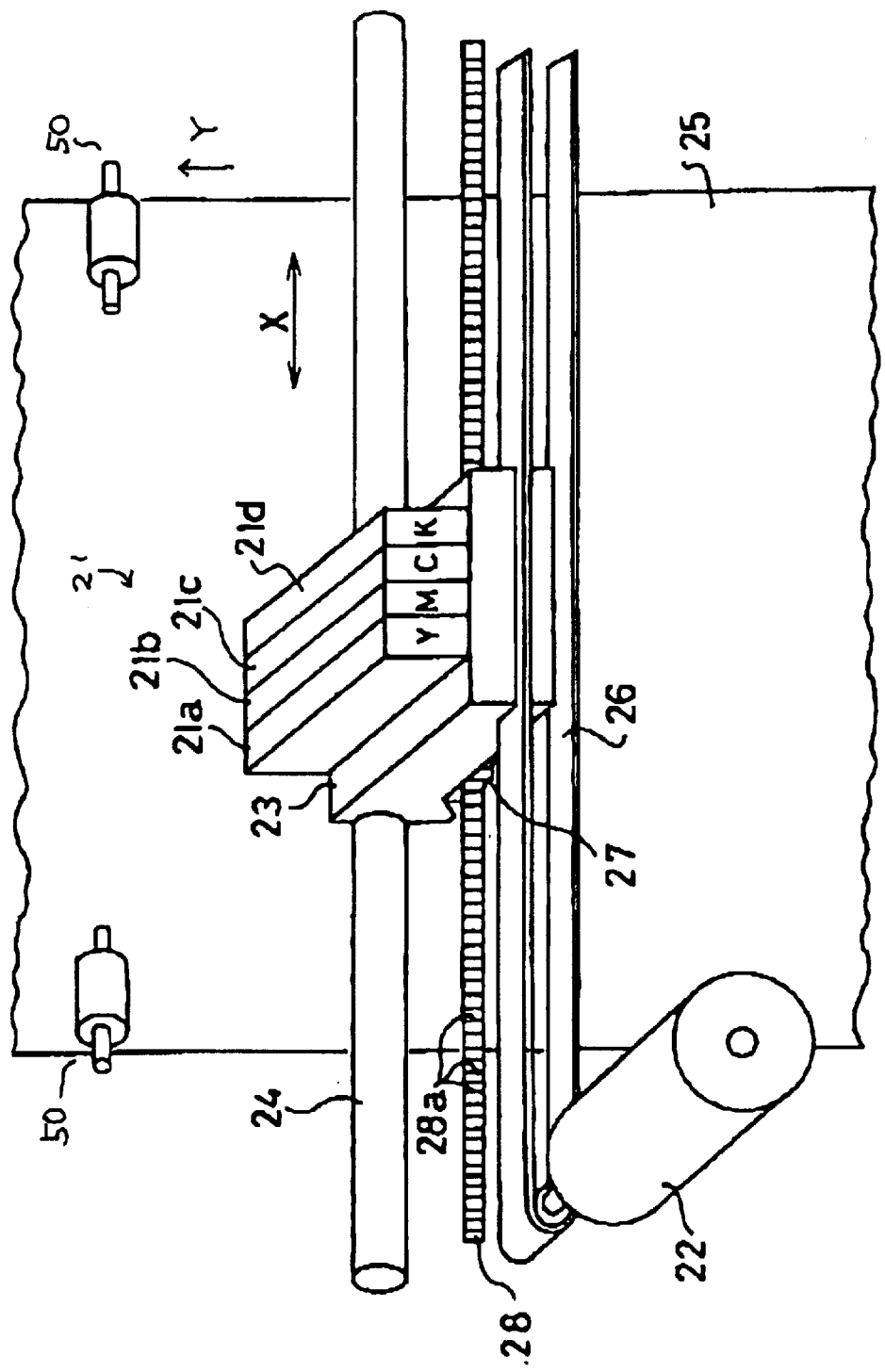
FIG. 4 is a perspective view of an essential portion of the printer.

The motor drive portion 20 is connected to a carriage motor 22 (shown in FIG. 4), and rotates the carriage motor 22 in a forward direction and in a reverse direction. The print head driving portion 19 is connected to a print head structure 21. The print head structure 21 is comprised of print heads 21a through 21d for respectively printing yellow color (Y), magenta color (M), cyan color (C), and black color (K). As shown in FIG. 4, the print heads 21a–21d are arranged in the main scanning direction X. Although not shown in the drawing, 64 nozzles for ejecting ink are arranged in each of the print heads 21a through 21d along the auxiliary scanning direction Y which is almost perpendicular to the main scanning direction X. Each of the print heads 21a–21d has a plurality of piezoelectric elements for driving the plurality of nozzles. The print head drive portion 19 is capable of selectively applying an electric drive voltage to each piezoelectric element of each of the print heads 21a–21d. When applied with the electric voltage, the piezoelectric element deforms, whereupon a corresponding nozzle ejects ink. It is noted that the print head drive portion 19 drives all the print heads 21a–21d when print data for multicolor images is supplied. The print head drive portion 19 drives a corresponding one of the print heads 21a–21d when print data for monochromatic images is supplied.

As shown in FIG. 4, the print heads 21a through 21d are fixed to a carriage 23 so that ink is ejected at a predetermined angle toward a sheet 25. The carriage 23 is mounted on a guide shaft 24 so as to be freely movable in the main scanning direction X. Also, a scanning belt 26 is connected to the carriage 23. The carriage motor 22 moves the carriage 23 along the guide shaft 24 in the main scanning direction X. Thus, the print heads 21a through 21d are scanned in the main scanning direction while a fixed distance is maintained between the print heads 21a through 21d and the paper 25. It is noted that the paper 25 is conveyed by a pair of sheet feed rollers 50 in the auxiliary scanning direction. The print controller 17 controls the carriage motor 22 to allow the print heads 21a–21d to print images at 720 dpi, 360 dpi, and 180 dpi.

An encoder element 27, made from a non-contact optical or electromagnetic sensor, is provided to the lower surface of the carriage 23. A timing slit scale board 28 is provided extending in parallel with the guide shaft 24, that is, extending in the main scanning direction. The timing slit scale board 28 is formed with a plurality of slit portions 28a which are arranged at equidistant intervals along the scale board 28. When the encoder element 27 moves in the main scanning direction with the carriage 23, the encoder element 27 detects the slit portions 28a and outputs an encoder signal. The encoder signal is supplied to the printer controller 17 as shown in FIG. 5.

Figure 5:
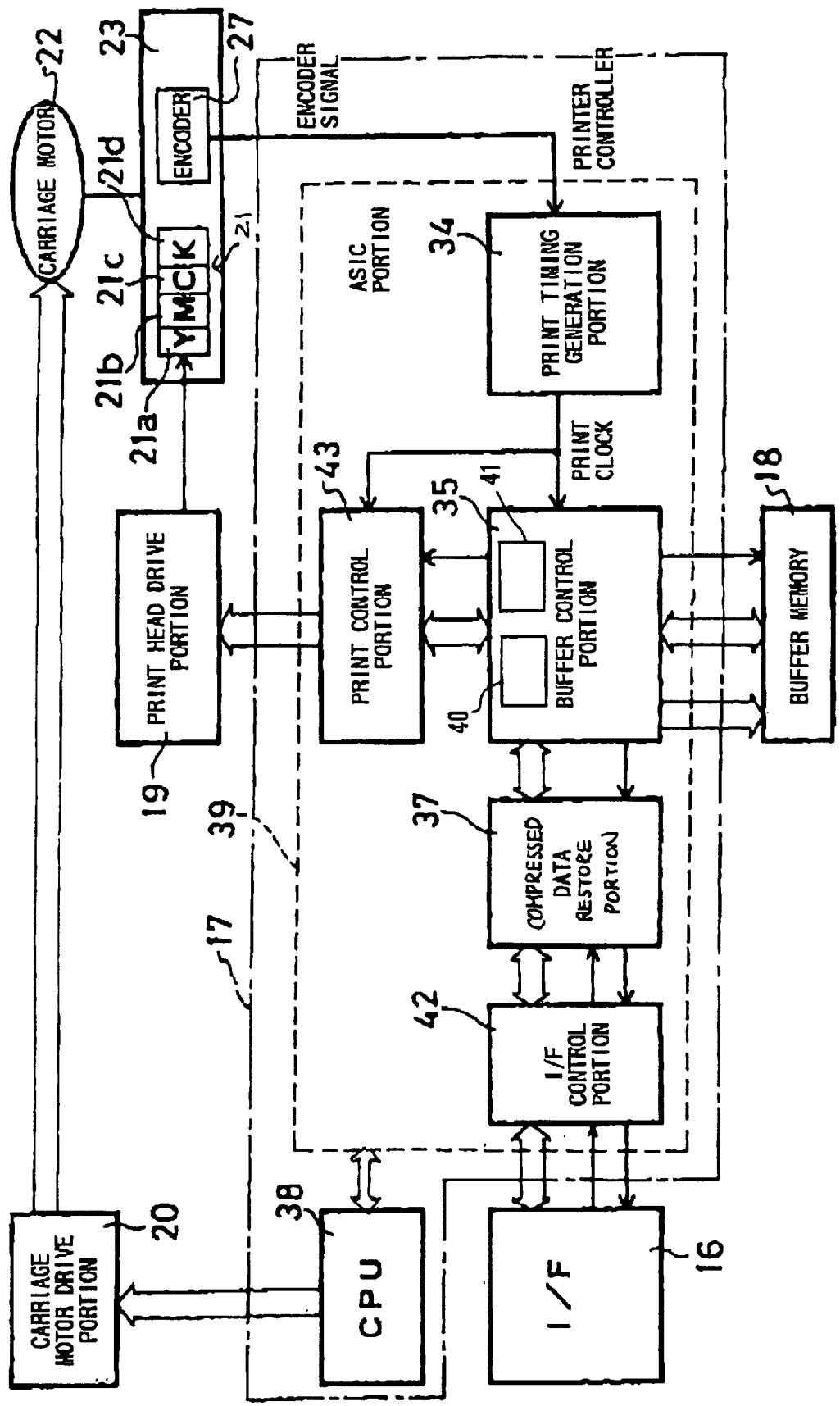
FIG. 5 is a block diagram showing an entire structure of the printer.

As shown in FIG. 5, the printer controller 17 includes: a print timing generation portion 34; a buffer control portion 35; a compressed (or frozen) data restoring portion 37; a CPU portion 38; an interface control portion 42; and a print control portion 43. The print timing generation portion 34, the buffer control portion 35, the compressed data restoring portion 37, the interface control portion 42, and the print control portion 43 are integrally formed in a single hardware logic circuit. In this example, the elements 34, 35, 37, 42, and 43 are integrally formed in an application specific integrated circuit (ASIC).

The print timing generation portion 34 is for receiving an encoder signal supplied from the encoder 27 and for outputting a print clock both to the print control portion 43 and the buffer control portion 41. The print clock is a timing signal, for example, servicing as a reference for reading print data from the buffer memory 18, controlling the print head drive portion 19 to drive the print head structure 21, and for other operations.

Figure 6:
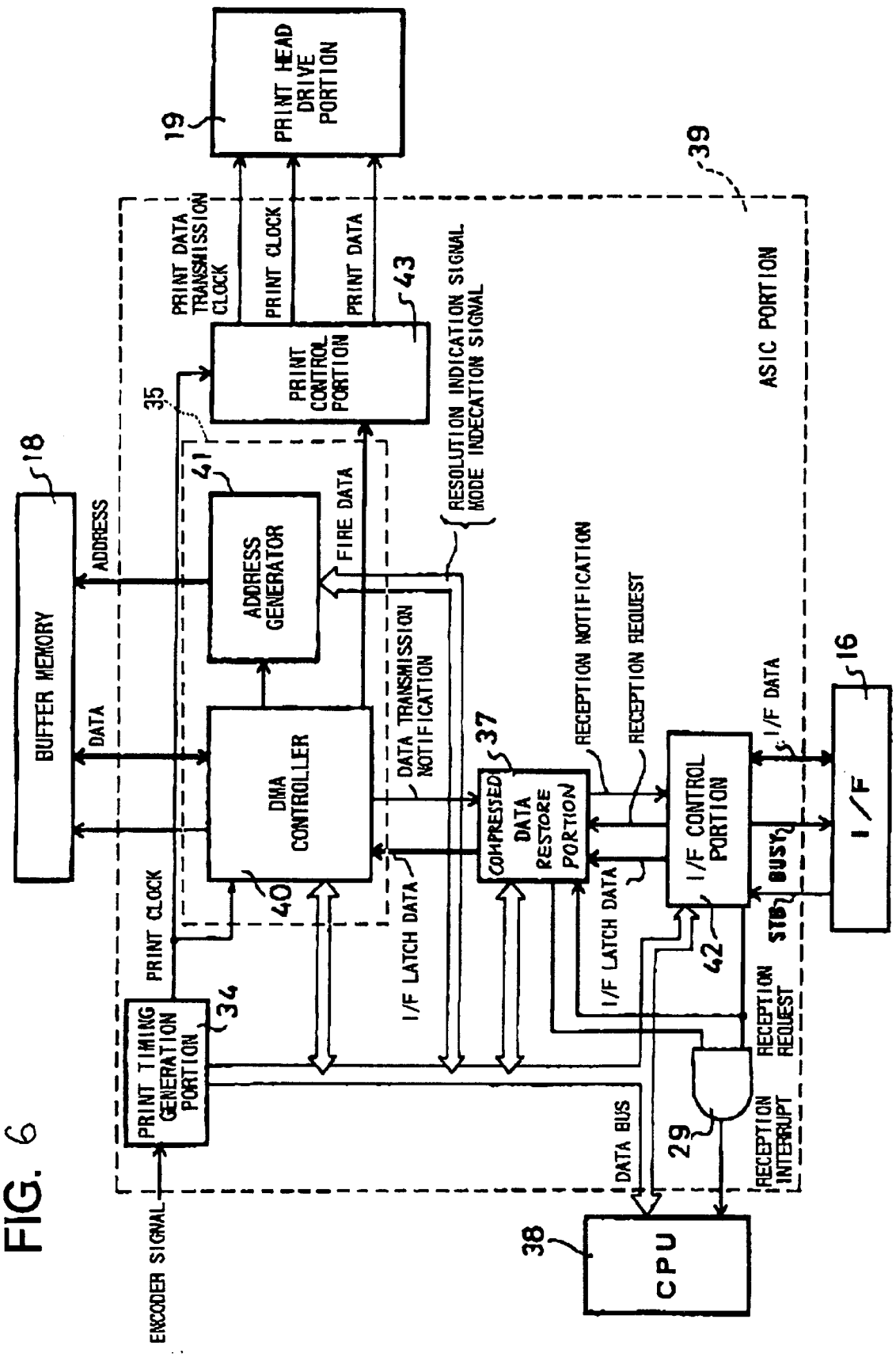
FIG. 6 is a block diagram of an ASIC portion in the printer.

As shown in FIG. 6, the buffer control portion 35 includes a DMA (direct memory access) controller 40 and an address generator 41. The DMA controller 40 is for writing print data to the buffer memory 18 and for reading print data from the buffer memory 18 and supplying the read out print data to the print control portion 43. The address generator 41 is for setting buffer areas in the buffer memory 18.

As described later, the address generator 41 is configured to receive a resolution indication signal and a mode indication signal from the CPU portion 38. The address generator 41 recognizes the resolution, that is, a 180 dpi, a 360 dpi, or a 720 dpi resolution, indicated by the inputted resolution indication signal. The address generator 41 also recognizes the print mode, that is, either a multicolor print mode or a monochromatic print mode, indicated by the print mode indication signal. The address generator 41 determines how to set buffer area(s) in the buffer memory 18 based on the recognized combination of the resolution and the print mode. That is, the address generator 41 determines show much amount of storage capacity is required to store one band's worth of print data of the recognized resolution and print mode. The address generator 41 further determines the number of buffer areas to be set in the buffer memory 18. Thus, the address generator 41 sets buffer areas appropriate for the recognized resolution and print mode in order to efficiently use the buffer memory 18.

It is noted that the buffer memory 18 has such a total storage capacity that can store at least one band's worth of print data for the multicolor print mode at the highest resolution of 720 dpi. That is, the buffer memory 18 has a storage capacity for storing the print data amount 16M at minimum.

The address generator 41 has an address memory AM as shown in FIG. 7 for storing buffer addresses of the buffer memory 18 in correspondence with the resolutions of 180 dpi, 360 dpi, and 720 dpi and the print modes of the multicolor print mode and the monochrome print mode. The buffer area addresses will serve as write addresses into which print data is written and read addresses from which print data is read out. As apparent from the figure, the address memory AM stores addresses "00000H", "10000H", "20000H", and "30000H" indicative of a first buffer area "IB-1" for printing data of yellow, magenta, cyan, and black for the resolution of 720 dpi and the multicolor print mode. Accordingly, when the address generator 41 recognizes that the resolution is 720 dpi and that the print mode is the multicolor print mode, then, as shown in FIG. 8(f), the address generator 41 sets only a single buffer area "IB-1 YMCK" in the buffer memory 18. The single buffer area "IB-1 YMCK" has four storage portions: a first portion from the address "00000H" for yellow (Y) color, a second portion from the address "10000H" for magenta (M) color, a third portion from the address "20000H" for cyan (C) color, and a fourth portion from the address "30000H" for black (K) color. The single buffer area "IB-1 YMCK" will store one band's worth of print data for all the colors.

The address memory AM further stores addresses "00000H", "10000H", "20000H", and "30000H" as firth through fourth buffer areas "IB-1", "IB-2", "IB-3", and "IB-4" for the resolution of 720 dpi and the monochromatic print mode. Accordingly, when the address generator 41 recognizes that the print mode is the monochromatic mode and that the resolution is 720 dpi, then, as shown in FIG. 8(c), the address generator 41 sets first through fourth buffer areas IB-1, IB-2, IB-3, and IB-4 for storing four bands' worth of print data for a single color. One band's worth of print data will be stored in the first buffer area from the address "00000H", a next band's worth of print data will be stored in the second buffer area from the address "10000H", a further next band's worth of print data will be stored in the third buffer area from the address "20000H", and a further next band's worth of print data will be stored in the fourth buffer area from the address "30000H".

For the resolution of 360 dpi and the multicolor print mode, the address memory AM stores: addresses "00000H", "08000H", "10000H", and "18000H" as a first buffer area "IB-1 YMCK" for print data of yellow, magenta, cyan, and black; and addresses "20000H", "28000H", "30000H", and "38000H" as a second buffer area "IB-2 YMCK" for print data of yellow, magenta, cyan, and black. Accordingly, when the print mode is the multicolor print mode and the resolution is 360 dpi, then as shown in FIG. 8(e), the buffer areas "IB-1 YMCK" and "IB-2 YMCK" are set for storing two bands' worth of print data for the four colors.

Similarly, the address memory AM further stores addresses "00000H", "08000H", "10000H", ... "38000H" for first through eighth buffer areas "IB-1", "IB-2", ... "IB-8" for the resolution of 360 dpi and the monochromatic print mode. Accordingly, when the address generator 41 recognizes that the print mode is the monochromatic mode and that the resolution is 360 dpi, then, as shown in FIG. 8(b), the address generator 41 sets firth through eighth buffer areas IB-1 through IB-8 for storing eight bands' worth of print data for a single color.

For the resolution of 180 dpi and the multicolor print mode, the address memory AM stores: addresses "00000H", "04000H", "08000H", and "0C000H" for a first buffer area "IB-1 YMCK"; addresses "10000H", "14000H", "18000H", and "1C000H" for a second buffer area "IB-2 YMCK"; addresses "20000H", "24000H", "28000H", and "2C000H" for a third buffer area "IB-3 YMCK"; and addresses "30000H", "34000H", "38000H", and "3C000H" for a fourth buffer area "IB-2 YMCK". Accordingly, when the print mode is the multicolor print mode and the resolution is 180 dpi, then as shown in FIG. 8(d), the buffer areas "IB-1 YMCK", "IB-2 YMCK", "IB-3 YMCK", and "IB-4 YMCK" are set for storing four bands' worth of print data for the four colors.

Similarly, the address memory AM further stores addresses "00000H", "04000H", "08000H", ... "3C000H" for first through sixteenth buffer areas "IB-1", "IB-2", ... "IB-16" for the resolution of 180 dpi and the monochromatic print mode. Accordingly, when the address generator 41 recognizes that the print mode is the monochromatic mode and that the resolution is 180 dpi, then, as shown in FIG. 8(a), the address generator 41 sets firth through sixteenth buffer areas IB-1 through IB-16 for storing sixteen bands' worth of print data for a single color.

Thus, the address generator 41 sets, in the buffer memory 18, one or more buffer area corresponding to the operator's selected resolution and print mode.

The DMA controller 40 is for controlling writing of each band's worth of print data to a corresponding buffer area in the buffer memory 14. That is, in response to a DMA command inputted from the CPU portion 38, the DMA controller 40 successively issues data transmission notification signals to the compressed data restoring portion 37 so as to request the portion 37 to supply successive rasters' worth of print data to the DMA controller 40. When receiving one raster's worth of print data, the DMA controller 40 writes the print data into a corresponding region in the buffer memory 18. The DMA controller 40 successively issues the data transmission notification signals until the DMA controller 40 completely receives one band's worth of print data and writes the print data in the buffer memory 18.

The DMA controller 40 is also for controlling reading of each band's worth of print data from the corresponding buffer area. That is, every time the DMA controller 40 receives the print clock from the print timing generation portion 34, the DMA controller 40 retrieves one band's worth of print data from the buffer memory 18 and supplies the print data, as fire data, to the print control portion 43.

As shown in FIG. 6, the print control portion 43 is for receiving a print clock from the print timing generation portion 34 and for receiving each band's worth of print data from the DMA controller 40. The print control portion 43 outputs a print data transmission clock and a print clock to the print head drive portion 19. The print control portion 43 also outputs each band's worth of print data to the print head drive portion 19 at a timing corresponding to the print data transmission clock.

The interface control portion 42 is for controlling the interface portion 16 to communicate with the interface portion 15 of the information process device 1. The control portion 42 is for receiving, from the interface portion 15, strobe (STB) signals and several types of interface (I/F) data, such as the mode indication command, the resolution indication command, the transmission command, and the successive rasters' worth of print data. The interface control portion 42 latches each raster's worth of print data of each color (I/F latch data) before transmitting the data to the compressed data restoring portion 37.

The interface control portion 42 is connected to the CPU portion 38 via a Centronics data reception interruption gate 29, which is formed from an AND circuit. The Centronics data reception interruption gate 29 is for controlling the CPU 38 to perform Centronics data reception interruption operation according to IEEE 1284 standard. When the interface control portion 42 receives a series of interface data (the print mode command, the resolution command, the transmit commands, and the successive rasters' worth of print data) and a strobe (STB) signal from the interface portion 16, the interface control portion 42 outputs a reception request signal to the Centronics data reception interrupt gate 29. Upon receipt of the reception request signal, the CPU portion 38 is brought into a condition capable of executing reception interrupt processes. The interface control portion 42 then supplies the CPU 38 with a command which is presently being received at the portion 42 and which is existing at the leading end of the series of interface data. The control portion 42 latches one rasters's worth of print data of a single color which is being transmitted subsequent to the command.

When the CPU portion 38 receives a resolution indication command and a mode indication command, the CPU portion 38 outputs a resolution indication signal and a mode indication signal to the address generator 41. The resolution indication signal is indicative of the operator's selected resolution, that is, 180 dpi, 360 dpi, or 720 dpi. The mode indication signal is indicative of the operator's selected print mode, i.e., a multicolor print mode or a monochromatic print mode. The CPU portion 38 then executes reception interrupt processes for controlling the address generator 41 to set buffer addresses in the buffer memory 18.

When the CPU portion 38 receives a transmission command, which is transmitted before each raster data of each color is transmitted, then the CPU portion 38 executes reception interrupt processes to output a DMA command both to the DMA controller 40 and to the compressed data restoring portion 37.

The interface control portion 42 outputs a reception request signal also to the compressed data restoring portion 37 so as to request the compressed data restoring portion 37 to receive and process one raster's worth of print data for a single color. The interface control portion 42 then outputs the print data (I/F latch data), which has been latched in the interface control portion 42, to the compressed data restoring portion 37 until the compressed data restoring portion 37 completely receives one raster's worth of print data for the single color and issues a reception notification signal. While outputting the print data to the portion 37, the interface control portion 42 outputs, via the interface portion 16, a busy signal to the information process device 1 so that the information process device waits in a stand-by state. The device 1 stops outputting a next series of print data.

The compressed data restoring portion 37 is thus inputted with one raster's worth of print data (I/F latch data) from the I/F control portion 42. In this situation, when receiving the DMA command from the CPU portion 38, the compressed data restoring portion 37 controls the gate 29 to be closed until the compressed data restoring portion 37 completes processing the received one raster's worth of print data and transmitting the processed print data to the DMA controller 40. Accordingly, while the compressed data restoring portion 37 transfers one raster's worth of print data to the DMA controller 40, the CPU portion 38 is prevented from performing reception interruption processes.

In response to a data transmission notification signal from the DMA controller 40, the compressed data restoring portion 37 starts processing the received one raster's worth of print data. That is, the compressed data restoring portion 37 restores the received print data when the data is compressed. The compressed data restoring portion 37 then supplies the restored print data to the DMA controller 40. The DMA controller 40 writes the received one raster's worth of print data into a corresponding storing region in the buffer memory 18, and transmits a next transmission notification signal to the compressed data restoring portion 37.

In more concrete terms, the compressed data restoring portion 37 determines whether or not the received print data is in a compressed form or not. When the print data is not in a compressed form, the compressed data restoring portion 37 outputs the print data (I/F latch data) each time a data transmission notification signal is inputted from the DMA controller 40. On the other hand, when the print data is in a compressed form, i.e., in a run length format, because the print data is constructed from print data and data indicative of a compressed time number, the compressed data restoring portion 37 repeatedly outputs the print data in the number of times the print data has been compressed. The compressed data restoring portion 37 performs its repeating output operation each time a data transmission notification signal is inputted from the DMA controller 40.

When one raster's worth of print data of one color is thus transferred to the buffer memory 18, the same raster's worth of print data of another color is transferred to the buffer memory 18 in the same manner as described above. When the one raster's worth of print data of all the four colors is completely transferred to the memory 18, the next raster's worth of print data is transferred to the memory 18.

Thus, 64 rasters' worth of print data of all the colors is successively written in the buffer memory 18. When the 64 rasters' worth of print data, i.e., one band's worth of print data for all the colors is completely stored in the buffer memory 18, then the CPU portion 38 outputs, to the DMA controller 40, a preparation signal to prepare for printing. At the same time, the CPU portion 38 starts scanning operations of the carriage 23 shown in FIG. 4. When the carriage 23 reaches a print start position, the print timing generation portion 34 outputs a print clock. Upon receipt of the print clock, the DMA controller 40 reads out the one band's worth of print data for all the colors from the buffer memory 18 and supplies the print data to the print control portion 43. The control portion 43 supplies the print data to the print head drive portion 19 where the print data is printed into a corresponding band image.

With the above-described structure, the ASIC 39 executes processes to set buffer areas in the buffer memory 18 in correspondence with the operator's selected resolution and print mode. Print data outputted from the information process device 1 is first inputted into the interface portion 16. The print data is then temporarily latched by the interface control portion 42 before being processed in the compressed data restoring portion 37. The processed print data is then written into and read out from a corresponding buffer area in the buffer memory 18 and then supplied to the print control portion 43.

With the above-described structure, the printing device 7 operates as described below.

First, the user operates the keyboard or the mouse 5 to instruct the CRT display 3 to show a print menu. Upon receipt of this instruction, the window system 8 starts operation of the printer driver 14 so that a format setting screen for setting font, print mode, resolution, and the like is displayed on the screen of the CRT 3. When the user designates his/her desired resolution and print mode, the printer driver 14 outputs a resolution indication command indicative of the designated resolution and a mode indication command indicative of the designated print mode to the interface portion 16. The interface portion 16 transmits these commands as interface data to the interface control portion 42 together with a strobe signal. The interface control portion 42 supplies a reception request signal to the Centronics data reception interrupt gate 29, which in turn brings the CPU portion 38 into an interrupt process enable condition. Then, the interface control portion 42 supplies these commands to the CPU 38 via the gate 29.

Upon receiving these commands, the CPU 38 determines the contents of the commands. That is, the CPU 38 determines the resolution and print mode indicated by the commands. Then, the CPU portion 38 outputs, to the address generator 41, a resolution indication signal and a mode indication signal corresponding to the contents of the commands. It is now assumed that the operator selects a resolution of 360 dpi and the multicolor print mode. In this case, the address generator 41 retrieves, from the address memory AM, data of the first and second buffer addresses for yellow, magenta, cyan, and black. As a result, as shown in FIG. 8(e), two buffer areas "IB-1 YMCK" and "IB-2 YMCK" for two bands' worth of print data are set for the four colors in the buffer memory 18.

Next, when the user manipulates the keyboard 4 or the mouse 5 to designate a print execution displayed on the screen of the CRT 3, print data for characters, figures, or a combination of both, which are to be the subject of printing, is read out from its storage position in a memory or electromagnetic disk (not shown). The print data for all the colors is read out in a raster scan format. The thus read out raster scan format print data is then outputted from the interface portion 15 in a raster order as eight bits' unit.

The thus supplied print data is inputted into the interface control portion 42 via the interface portion 16. When the CPU portion 38 receives a data transmission command, then the CPU portion 38 outputs a DMA command both to the DMA controller 40 and the compressed data restoring portion 37. As a result, print data for the four colors is written in the first buffer addresses 00000H(Y), 08000H(M), 10000H(C), and 18000H(K) of the first buffer area "IB-1 YMCK". That is, print data for yellow color is successively stored in a storage region from the buffer address 00000H (Y), print data for magenta color is successively stored in a storage region from the buffer address 08000H(M), print data for cyan color is successively stored in a storage region from the buffer address 10000H(C), and print data for the black color is successively stored in a storage region from the buffer address 18000H(K).

Afterward, when one band's worth, that is, 64 rasters' worth of print data are written in the first buffer area "IB-1 YMCK" for all the colors, then the CPU portion 38 outputs, to the DMA controller 40, a preparation signal to prepare for printing. At the same time, the CPU portion 38 starts scanning operations of the carriage 23 shown in FIG. 4. When the carriage 23 reaches a print start position, the print timing generation portion 34 outputs a print clock. Upon receipt of the print clock, the DMA controller 40 reads print data for all the colors from the first buffer area "IB-1 YMCK". As a result, print dots for yellow color (Y), magenta color (M), cyan color (C), and black color (K) will be printed on the sheet 25.

While one band's worth of print data is thus printed in the manner described above, the next set of print data, i.e., a next band's worth of print data is inputted to the interface control portion 42. When a transmission command is inputted, the transmission command is supplied to the CPU portion 38. Upon receipt of the transmission command, the CPU portion 38 outputs a DMA command to the DMA controller 40 and to the compressed data restoring portion 37. Then, one band's worth of print data for all the colors is written in the second buffer addresses 20000H(Y), 28000H(M), 30000H (C), and 38000H(K) of the second print buffer "IB-2 YMCK". That is, print data for yellow color is stored in a storage region from the buffer address 20000H(Y), print data for magenta color is stored in a storage region from the buffer address 28000H(M), print data for cyan color is stored in a storage region from the buffer address 30000H(C), and print data for black color is stored in a storage region from the buffer address 38000H(K). Afterward, when the print data is completely written in the second print buffer "IB-2 YMCK", then this band's worth of print data is retrieved from the second print buffer "IB-2 YMCK" and printed. At the same time, a further subsequent band's worth of print data is written in the first print buffer "IB-1 YMCK".

Figure 9:
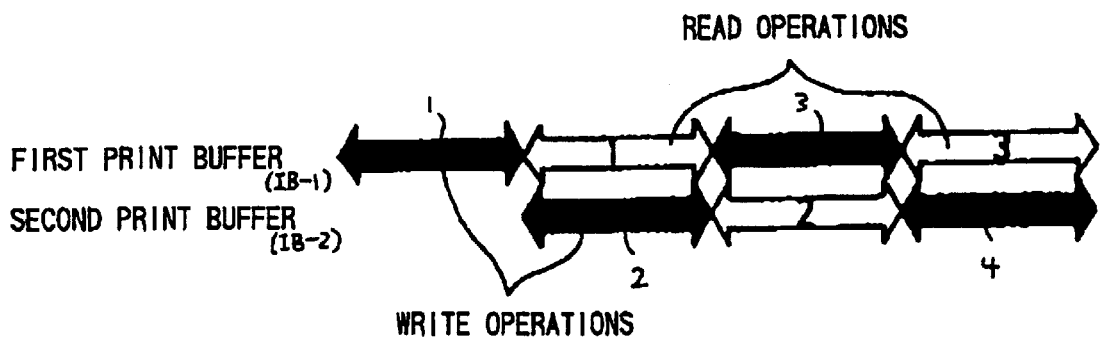
FIG. 9 shows how writing operation and reading operation are achieved onto two buffer area.

In the above description, time length required to write print data into the buffer memory 18 is substantially the same as time length required to retrieve print data from the buffer memory 18 and then to print the retrieved print data. Accordingly, as shown in FIG. 9, operations for writing print data and for reading print data are performed alternately for the first print buffer "IB-1 YMCK" and the second print buffer "IB-2 YMCK". Because printing for successive bands is performed without any interruption therebetween, printing can be completed within a shorter period of time than when only a single buffer area is used.

It is noted that there is a case where the time length required for writing print data is different from the time length required for reading print data to print it. For example, when less time is required for writing print data than for reading print data, the CPU portion 38 will be idle for a certain amount of time before each print operation is completed. When more time is required for writing print data than reading print data, print operations will be temporarily suspended.

Figure 10:
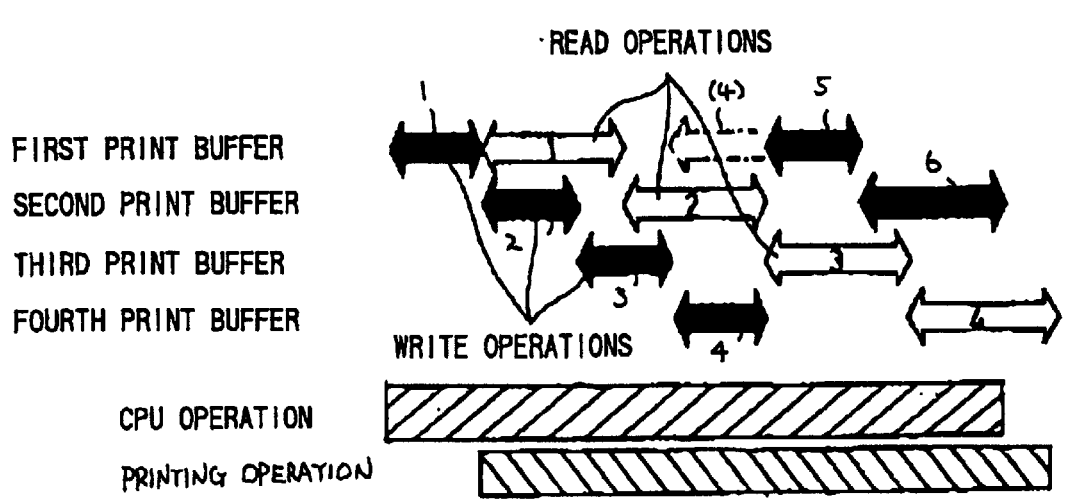
FIG. 10 shows how writing operation and reading operation are achieved onto four buffer areas.

However, when four or more buffer areas are set as shown in the examples in FIG. 8(a) through 8(d), at least four buffer areas are established for each color in the buffer memory 18. In this situation, as shown in FIG. 10, when the time required for writing print data is different from the time required for reading print data to print it, then the time difference will be absorbed by the first through fourth buffer areas. Accordingly, the CPU 38 and the ASIC portion 39 can continuously perform its data writing operation, and the motor drive portion 20 can continuously drive the carriage motor 22 as apparent from the figure. Therefore, printing can be completed in a shorter time than when only two buffer areas are used. It should be noted that this operation can be realized when at least three bands' worth of buffer areas are set. When three bands' worth of buffer areas are set, the first buffer area will be written with a fourth band's worth of print data (4) at a timing as indicated by a two dot-chain line in FIG. 10. It is therefore preferable that at least three bands' worth of print data storage areas be set in the buffer memory 18. Even though the time length required to write print data is different from that required to read print data, the time difference can be completely absorbed as shown in FIG. 10. Accordingly, when a low resolution is selected, at least three bands' worth of areas are preferably set in the buffer memory 18.

Figure 11:
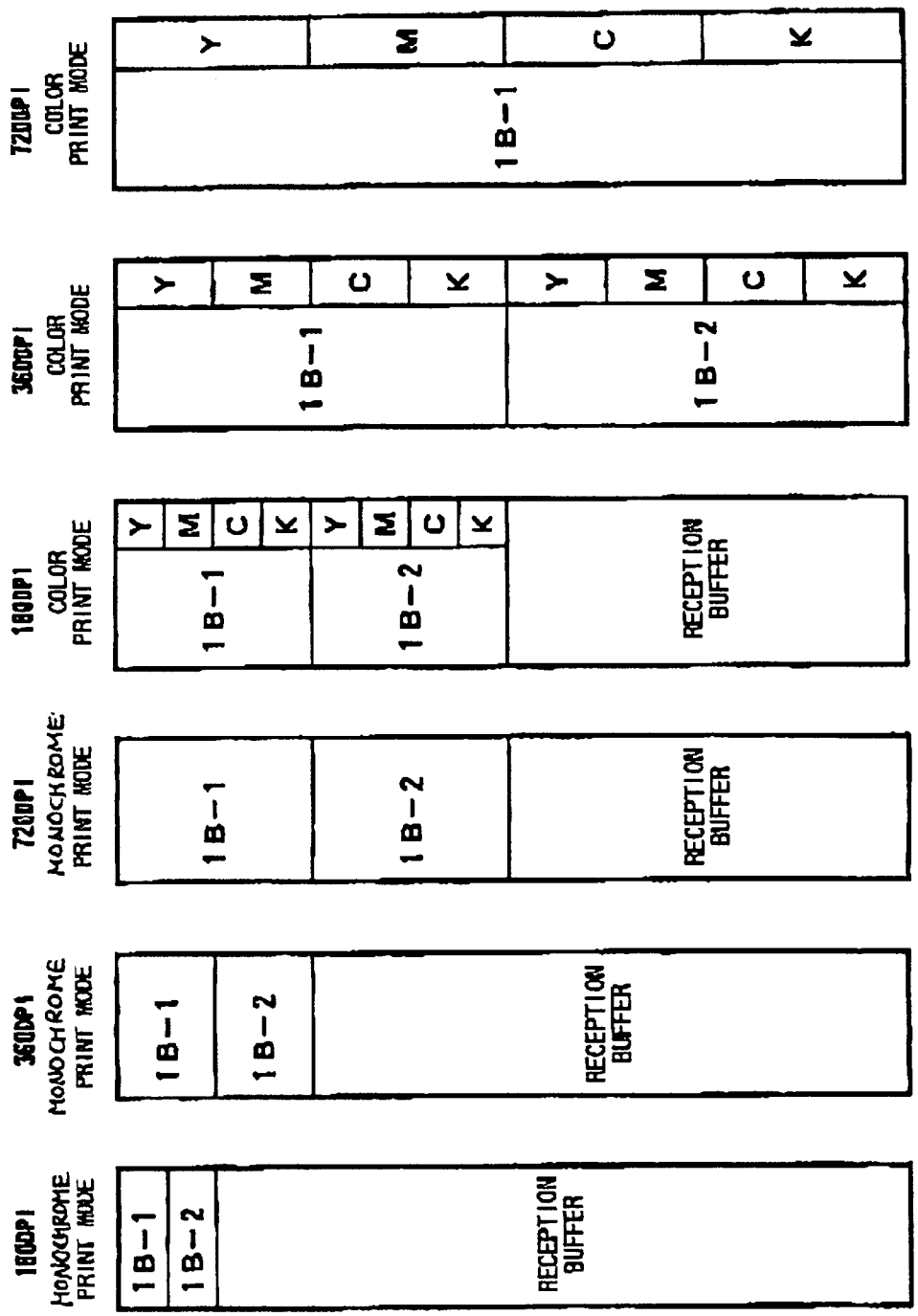
FIG. 11 illustrates how the buffer memory is set with at least one buffer area according to the resolution and the print mode according to a modification of the present embodiment.

A modification of the present embodiment will be described below with reference to FIG. 11.

In the above-described embodiment, buffer areas are set in the entire memory region of the buffer memory 18. However, it is unnecessary to use the entire memory region. For example, as shown in FIG. 11, an upper limit for the number of buffer areas formed in the buffer memory can be set to two, and the remainder of the memory regions can be set for use as reception buffers for directly receiving the Centronics data successively transmitted from the device 1. With this configuration, subsequent print data and commands can be consecutively stored in the reception buffer. Therefore, waiting time required for receiving print data can be reduced so that the print speed of the device can be improved.

As described above, according to the present embodiment, the buffer memory is set with at least one buffer area for storing one band's worth of print data. A storage capacity of each buffer area and the number of the at least one buffer area are determined dependently on the resolution and the print mode. When more than one buffer area is set to simultaneously store more than one band's worth of data, the buffer areas are serially switched for printing. Therefore, the buffer memory can be constantly used with high efficiency.

Especially, while one band's worth of print data is being retrieved from a specific buffer area, subsequent bands' worth of print data can be written in other buffer areas. Therefore, the print head can be constantly supplied with successive bands' worth of print data and therefore can constantly perform its printing operation. As a result, a print speed can be increased.

Three or more buffer areas are set in the buffer memory for a lower resolution. With this configuration, while one band's worth of print data is being retrieved from a certain buffer area, subsequent bands' worth of print data is written in the remaining two or more buffer areas. Therefore, the print speed can be effectively increased.

According to the modification, subsequent bands' worth of print data is stored in a reception buffer region. Therefore, the waiting time required for receiving print data can be reduced and the print speed of the device can be improved.

In the embodiment, the storage regions for the multicolor print mode and the storage regions for the monochrome print mode are set in the same address portions in the buffer memory. Not only are the storage regions efficiently used with respect to resolution, but also with respect to the print mode.

According to the present embodiment, the print head structure 21 has four print heads 21a–21d for cyan, magenta, yellow, and black colors. During a monochromatic print mode, only one print head is sued for printing a corresponding single color. With this configuration, full color printing is possible during the multicolor print mode by using a combination of the plurality of color print heads. In addition, the printing device can be used as a normal monochrome printing device in the monochrome print mode by using only one color print head.

According to the present embodiment, the hardware logic circuit is employed to set the buffer areas in the buffer memory and to control reading and writing operation from and into the buffer memory. With this configuration, setting operation of the storage regions in the buffer memory and reading and writing operations in the storage regions can be performed independently from other print controls performed by the CPU. In this way, burden on the CPU is reduced so that an inexpensive CPU can be used.

Because the print is of an ink jet printer type, clean and silent printing can be performed.

While the invention has been described in detail with reference to the specific embodiment thereof, it would be apparent to those skilled in the art that various changes and modifications may be made therein without departing from the spirit of the invention.

In the embodiment, the printer 7 can print images in a plurality of resolutions and both in a color mode and in a monochromatic mode. However, the printer 7 can be designed to print images at a single resolution both for the color and monochromatic modes. In this case, the operator can select only his/her desired print mode. The device 1 may transmit only the print mode command to the printer 7. The printer 7 may set the buffer area(s) only based on the operator's selected print mode. Similarly, the printer 7 may be designed to print images only in the color mode or in the monochrome mode. In this case, the operator may select only his/her desired resolution. The device 1 may transmit only the resolution command to the printer 7. The printer 7 will set buffer area(s) only based on the resolution.

In the embodiment, the operator can select the monochromatic print mode as a mode for driving only one of the four print heads 21a–21d. However, the printer 7 may be designed sot hat the operator can select a black-and-white print mode as the monochrome mode. In this case, only the black head 21d will be driven.

What is claimed is:

1. A printing device for receiving print data and for printing an image represented by the print data, the device comprising:

print data receiving means for receiving print data indicative of an image and for receiving information on an amount of the print data;

a buffer memory capable of temporarily storing the received print data;

storage region setting means for setting at least one storage region in the buffer memory based on the received information on the amount of print data;

write and read means for writing the print data in the storage region of the buffer memory and for reading the print data from the storage region of the buffer memory; and a print head for receiving the print data read out by the write and read means to print the image.

2. A printing device as claimed in claim 1, wherein the storage region setting means sets the at least one storage region so that a capacity of each of the at least one storage region is determined dependent on the amount of print data.

3. A printing device as claimed in claim 2, wherein the storage region setting means sets the at least one storage region so that the number of the at least one storage region is determined dependent on the amount of print data.

4. A printing device as claimed in claim 3, wherein the information on the print data amount includes resolution of the image represented by the print data.

5. A printing device as claimed in claim 3, wherein the information on the print data amount includes the number of different color included in the image represented by the print data.

6. A printing device as claimed in claim 3, wherein the control means controls the write and read means to write the print data into one of the at least one storage region while reading the print data into another one of the at least one storage region.

7. A printing device as claimed in claim 6, wherein the control means serially switches the at lest one storage region to be written and read by the write and read means.

8. A printing device as claimed in claim 1, wherein the data receiving means receives a successive sets of print data, each print data set indicating a corresponding image portion in the image, the data receiving means receiving information on the amount of each set of print data, and wherein the storage region setting means sets the capacity of each of the at least one storage region so that each storage region stores a corresponding set of print data.

9. A printing device as claimed in claim 8, wherein the number of the at lest one storage region is determined dependent on the amount of each set of print data.

10. A printing device as claimed in claim 9, wherein each print data set amount is determined dependently on resolution of the image represented by the print data.

11. A printing device as claimed in claim 10, wherein each print data set amount is determined further dependently on whether each print data set includes a single kind of print data for a single color or a plurality of kinds of print data for the plurality of different colors.

12. A printing device as claimed in claim 11, wherein when the storage region setting means sets more than one storage regions, the control means controlling the write and read means to write a print data set into one storage region while reading another print data set from another storage region.

13. A printing device as claimed in claim 12, wherein the control means serially switches the more than one storage region to be written and read by the write and read means.

14. A printing device as claimed in claim 13, further comprising: a print moving mechanism for moving the print head in a main scanning direction across an entire width of a recording medium, the print head printing one band of image based on a corresponding set of print data while the printing moving mechanism moves the print head in the main scanning direction across the entire width of the recording medium.

15. A printing device as claimed in claim 1, wherein the write and read means includes a DMA controller.

16. A printing device capable of printing in a plurality of resolutions, the device comprising:

data reception means for receiving successive sets of print data indicative of successive image portions;

a buffer memory capable of being set with a storage region for storing the received print data;

a controller for receiving an indication signal indicating a resolution of each image portion and for setting at least one storage region in the buffer memory, the number of the at least one storage region and storage capacity of each storage region being determined dependent on the resolution;

write means for writing each set of print data in one of the at least one storage region;

read means for reading each set of print data from the storage region and for printing a corresponding image portion based on the read set of print data; and switch means for, when the controller sets more than one storage region, serially switching the more than one storage region to be read, thereby allowing the read means to print the successive image portions.

17. A printing device as claimed in claim 16, wherein the read means includes a print head for printing each image portion based on the read set of print data, further comprising a print moving mechanism for moving the print head in a main scanning direction across a recording medium while the print head prints an image portion based on the set of print data, thereby printing one band image.

18. A printing device as claimed in claim 17, wherein the switching means switches so that writing by the write means and reading by the read means are performed simultaneously onto different storage regions.

19. A printing device as claimed in claim 18, wherein the plurality of resolutions include at least a first resolution and a second resolution lower than the first resolution, the controller setting the number of regions to three or more when the indication signal indicates the second resolution.

20. A printing device as claimed in claim 16, wherein the controller sets a reception buffer region for storing print data received from an external device, the controller setting the reception buffer region in a portion other than the at lest one storage region, the number of which corresponds to the resolution.

21. A printing device as claimed in claim 16, wherein the print head includes a plurality of print head units each for printing a corresponding color, and wherein the controller sets at least one storage region in correspondence with each of the print head units when the received indication signal indicates a multi-color print mode and sets at least one storage region in correspondence with one of the head units when the received indication signal indicates a monochrome print mode.

22. A printing device as claimed in claim 21, wherein the print head includes print head units of yellow, magenta, cyan, and black colors, further comprising a print head driving means for driving only a single print head unit during the monochrome print mode.

23. A printing device as claimed in claim 16, wherein the write means, the read means, and the controller are configured from a single integral hardware logic circuit.

24. A printing device as claimed in claim 18, wherein the print head includes an ink jet head.

25. A printing device for receiving print data and for printing an image, the device comprising:

data receiving means for receiving successive sets of print data and for receiving an indication signal indicative of either a multi-color print mode or a monochrome print mode;

a plurality of print heads each for printing a corresponding one of a plurality of different colors;

a buffer memory capable of storing, for each print head, at least one set of print data;

control means for setting at least one storage region in correspondence with each of the plurality of print heads upon receiving the indication signal for the multi-color print mode and for setting more than one storage region in correspondence with one of the print heads upon receiving the indication signal for the monochrome print mode, each storage region having a storage capacity capable of storing one set of print data for a corresponding color;

write means for writing the print data in the storage region;

read means for reading the print data from the storage region; and switching means for serially switching the more than one storage region, which are set during the monochrome print mode, to be written and to be read.

26. A printing device as claimed in claim 25, wherein the switching means switches so that writing by the write means and reading by the read means are performed simultaneously onto different storage regions.

27. A printing device as claimed in claim 25, wherein the buffer memory has a storage capacity capable of being set with four storage regions; and the control means sets at least two storage regions for a single head during the monochrome printing.

* * * * *